United States Patent [19]
Weis et al.

[11] Patent Number: 6,153,099
[45] Date of Patent: Nov. 28, 2000

[54] BIOLOGICAL WASTE TREATMENT PROCESS AND APPARATUS

[75] Inventors: Frank G. Weis, Kansas City; Lindy Ty Cooper, Greenwood, both of Mo.

[73] Assignee: Smith & Loveless, Inc., Lenexa, Calif.

[21] Appl. No.: 09/218,805

[22] Filed: Dec. 21, 1998

[51] Int. Cl.$^7$ .................................................. C02F 3/02
[52] U.S. Cl. .................. 210/615; 210/621; 210/622; 210/629; 210/696
[58] Field of Search ..................................... 210/615–617, 210/621, 622, 620, 629, 623, 624, 150, 151, 696

[56] References Cited

U.S. PATENT DOCUMENTS

| | | |
|---|---|---|
| 2,200,581 | 5/1940 | Pruss et al. . |
| 2,308,866 | 1/1943 | Dekema . |
| 3,462,360 | 8/1969 | McKinney . |
| 3,627,131 | 12/1971 | Goodman et al. . |
| 3,671,022 | 6/1972 | Laird et al. . |
| 3,764,525 | 10/1973 | Goodman et al. . |
| 3,789,986 | 2/1974 | Oldham et al. . |
| 3,801,075 | 4/1974 | Weis . |
| 3,831,755 | 8/1974 | Goodman et al. . |
| 3,886,071 | 5/1975 | Weis . |
| 3,957,633 | 5/1976 | Gatti et al. . |
| 3,966,599 | 6/1976 | Burkhead . |
| 3,966,608 | 6/1976 | Mason et al. . |
| 3,972,965 | 8/1976 | Higgins . |
| 4,207,180 | 6/1980 | Chang . |
| 4,271,013 | 6/1981 | Bhattacharyya . |
| 4,274,966 | 6/1981 | Palmer . |
| 4,278,546 | 7/1981 | Roesler . |
| 4,411,780 | 10/1983 | Suzuki et al. . |
| 4,426,293 | 1/1984 | Mason et al. . |
| 4,599,174 | 7/1986 | McDowell . |
| 4,614,589 | 9/1986 | Weis . |
| 4,954,257 | 9/1990 | Vogelpohl et al. . |
| 5,156,742 | 10/1992 | Struewing . |
| 5,166,072 | 11/1992 | Krauling et al. . |
| 5,190,646 | 3/1993 | Hattori et al. . |
| 5,211,844 | 5/1993 | Hattori et al. . |
| 5,352,357 | 10/1994 | Perry . |
| 5,545,327 | 8/1996 | Volland . |
| 5,578,202 | 11/1996 | Hirane . |
| 5,837,141 | 11/1998 | Vogelpohl . |

OTHER PUBLICATIONS

G.H. Werkman and P.W. Wilson, "Bacterial Physiology," 1951 (24 pages).

Ross E. MicKinney, "Microbiology for Sanitary Engineers," 1962 (24 pages).

Brian L. Goodman et al., "Notes On Activated Sludge," Third Edition–Revised 1971, (89 pages).

*Primary Examiner*—Duane Smith
*Assistant Examiner*—Fred Prince
*Attorney, Agent, or Firm*—Rockey, Milnamow & Katz, Ltd.

[57] ABSTRACT

An apparatus for wastewater treatment, includes a calorie reducer first vessel having an inlet and an outlet, the outlet adapted to control the retention time of wastewater within the first vessel. A first recycle pump is connected to the first vessel to recycle wastewater from a bottom of the first vessel to a top of the first vessel through a recycle conduit, at a high velocity. The recycle conduit provides an air gap for drawing air into the first vessel. Bacteria within the calorie reducer vessel consume biodegradable food with a minimum number of bacteria while in the log growth phase. A second bio-reducer vessel is connected to the calorie reducer vessel. The bio-reducer holds a media supported above a bottom reservoir. A bio-reducer recycle pump recycles wastewater within the reservoir to be sprayed onto a top of the bio-reducer, to wash over the media. Further bio-reducers can be arranged downstream of the first bio-reducer. In the bio-reducers, protozoa attached to the media consume the bacteria which wash over the media.

19 Claims, 5 Drawing Sheets

BIOLOGICAL WASTE TREATMENT PROCESS AND APPARATUS

TECHNICAL FIELD OF THE INVENTION

The invention relates to a treatment process that reduces waste in a fluid stream by using an active bacterial mass.

BACKGROUND OF THE INVENTION

There exists a plurality of wastewater treatment processes. In an "activated sludge" process, biomass is generated and retained for a period of time in a reactor. In a typical activated sludge process, the retention time in the reactor will be approximately eight hours at design flow. The biomass concentration in the mixed liquor biomass in the reactor will be from 1500 to 3000 mg/L. The bulk of this mass will be in an "endogenous respiration state", i.e., microorganisms being in an environment with a low food to microorganism ratio, and the mass of microorganisms and the food concentration ratio remaining constant. The microorganisms must metabolize their own protoplasm. The biomass requires a large supply of oxygen. The increased oxygen demand is difficult to supply.

In an activated sludge process, as the retention time is shortened, to obtain the same bacterial synthesis, the oxygen requirement increases. This oxygen requirement is needed to grow bacterial mass when utilizing the "food", or organic waste matter, in the wastewater. Consuming more food in a shorter time requires more bacterial mass and a greater "oxygen uptake rate" (rate of oxygen consumed by the bacteria).

A "high rate" activated sludge plant carries 200 to 500 mg/L biomasses. Microorganisms are in a steady state growth phase with six hours retention time. In this state the oxygen requirement is about as high as can be practically supplied. The bacteria do not flocculate and cannot be settled-out, resulting in high effluent "BOD" (biochemical oxygen demand) as well as high solids that will not meet typical 30 mg/L BOD and 30 mg/L solids effluent requirements. Typically, the effluent would be approximately 100 mg/L BOD and 100 mg/L solids. BOD is a measurement of biologically degradable organics in wastewater.

In a "dispersed" activated sludge process, the treatment plant loading maintains the bacteria in the "log growth phase" i.e., a bacterial growth phase characterized as having a maximum rate of synthesis. At the end of the log growth phase the microorganisms are growing at their maximum rate. There is little flocculation so that the mixed liquor is a discrete bacterium. A very small active mass can consume the food. All of the food is used in creating mass, so there is no oxygen requirement for endogenous respiration. Less oxygen is required. The bacteria in such a dispersed phase more quickly and completely consume the food. With food supply varying, some flocculation can occur at low flow rates.

The maximum oxygen transfer rate and the maximum rate of growth of bacterial mass during high load conditions are process limitations. Also, lower wastewater loads can result in flocculation and higher BOD and solids in the effluent, as well as higher oxygen requirements. A reduction of the effluent BOD and solids below approximately 60% of the influent BOD and solids has not been achieved.

The various types of activated sludge systems can produce quality effluent in some cases but all result in large quantities of sludge for disposal. Also, in high rate activated sludge processes at 120 pounds of BOD/1000 ft$^3$ per day or above, it becomes difficult to transmit enough oxygen to the water to maintain satisfactory dissolved oxygen levels.

In waste treatment processes, to maintain the log growth phase, the organic concentration in the liquid surrounding the microorganisms must be high. It is difficult to produce a stable effluent while the microorganisms are in log growth phase because a large concentration of food will typically pass through the plant unconsumed by the bacteria, during the growth of the bacteria. In waste bacteria aerobic processes a maximum rate of oxygen is demanded. The maximum oxygen transfer rates from available diffused-air equipment limits the rate of growth in the log growth phase.

A "submerged media" process has microbes attached to the media. The liquid-containing waste is aerated and circulated through the media. Instead of having flocculated clumps of endogenous bacteria circulating in the mixed liquor, the inactive growth is attached to the media with active bacteria on the surface. There is an aerobic endogenous layer below the active bacteria layer, and then an anaerobic layer from there to the media. Being attached, succeeding layers build up over existing layers. The process produces about the same mass of solids as complete mix-activated sludge, but may be retained longer and be reduced in volume by longer endogenous respiration or anaerobic digestion. Process loading is limited by maximum aeration and maximum mixing. As the solids build up they have about the same weight as the liquid. This allows large accumulations that may start sloughing-off from circulation currents. The accumulations may plug up the media.

The bacterial growth is fastest where the influent enters the process and the microbes have access to nearly unlimited food. As the microbes are attached they never move from the food source as they would in suspended growth aeration systems. Solids must be removed at frequent periods. Food-to-organism distribution is uneven depending upon distance or position related to the food source.

The process cannot be operated at a high rate because of difficulty of dispersing oxygen and food through the media. The process produces sludge which must be wasted in some manner. The effluent is low in solids and BOD because of the microbes being attached to the media, but only if the media is purged of solids often enough to prevent sloughing.

In a "ring lace" process, the media surface is shaped like long stretched coil springs. The media coils are composed of a synthetic material. The coils are not closely spaced making it easier to circulate liquid and oxygen therebetween. The process cannot be considered a high rate system because of the small amount of available surface area. The process does not work as well in colder climates due to the fact that less heat is generated due to the small surface area of the media. Some sludge is produced. Part of the food is utilized by suspended microbes and part of the food is utilized by attached microbes. No clarifier is required because the attached microbes consume enough of the dispersed microbes to keep effluent quality satisfactory. Solids must be shaken from the ring lace frequently to avoid sloughing and effluent deterioration.

In a "trickling filter" process, liquid-containing food flows in a thin film over media coated with both a fixed film of microbes and a fixed film of liquid over the microbes. To be efficient, the hydraulic loading must wash the attached growth from the media to keep the surface active. A clarifier must remove the sloughed solids. High rate trickling filters stabilize the removal of organic matter to only about 75%. For stronger wastes, recirculation is required to help dilute the incoming load and carry the untreated load back for further treatment. These filters have been loaded up to 90 lb/1000 ft³/day.

Trickling filters known as "super rate" trickling filters have been loaded as high as 100 lb/1000 ft³/day. These filters are vertical filters with great depth having media with attached microbial growth. The filters produce a large volume of solids that must be wasted. The filters carry microbial growth in recirculation liquid. The attached microbial growth only treats a small portion of the liquid because the oxygen and food can't be transferred fast enough to the attached microbial growth.

In existing trickling filters, the effluent BOD-and-solids load is directed to the media. Bacteria and protozoa are attached to the media. This is not conducive to effective treatment because neither bacteria nor protozoa is in the most advantageous place to be optimally effective. This process has used two stages. The resulting effluent is about 50 mg/L BOD and 50 mg/L solids. Waste solids are created which require disposal.

Aerobic treatment processes generate large volumes of solids. The shorter the retention time and the higher the loading, the greater the amount of solids produced. The treatment processes are designed to retain the solids to be used in the settling process which is necessary for acceptable effluent. This excess volume of solids must be disposed of by means that are becoming less and less ecologically sound. A disposal of the solids can result in high costs and may be banned altogether. In high rate aerobic processes, it has been difficult to transfer enough oxygen to support the biological mass. This has limited the BOD-and-solids loading and/or increased the process cycle length.

The present invention recognizes that it would be desirable to provide a process that works with just active mass. The present invention recognizes that it would be desirable to treat with the minimum number of bacteria. The present invention recognizes that it would be desirable to provide a process designed to work with large mass bacteria. The present invention recognizes that it would be desirable to provide a process to work with a minimum number of protozoa. The present invention recognizes that it would be desirable to provide a process having the media surface area covered with a minimum number of protozoa.

SUMMARY OF THE INVENTION

The present invention contemplates a treatment process that reduces the BOD, solids, and other waste matter in the effluent stream using a small, active bacterial mass. This small population of active bacteria is subsequently reduced to magnitude lower numbers by attached protozoa. Everything produced by the process is discharged in the effluent stream. The contents of the effluent stream in terms of BOD, solids, and other waste matter are well below prescribed discharge limits.

The treatment process is accomplished by an apparatus which includes a calorie reducing reactor vessel for receiving biologically degradable waste in wastewater through an influent line. The wastewater is retained within the vessel for a retention time of 2 to 4 hours, and preferably 3 hours based on peak flow. A retention time of 4 hours is a desirable retention time from a practical standpoint based on varying influent rates and limitations on oxygen uptake rates.

The influent BOD, inert solids and biodegradable solids are instantaneously mixed with bacterial mass held within the vessel. The wastewater within the vessel is mixed by a grinder pump that disintegrates solids, homogenizes the wastewater and pumps the wastewater at a high velocity through a pipe which discharges the wastewater back into the vessel. A high velocity jet of wastewater from the pipe draws a large quantity of air into the vessel with the wastewater. Wastewater is discharged from the vessel through an orifice which is sized to regulate flow rate. A separator prevents any solids not disintegrated by the pump from leaving the vessel through the orifice. Oxygen from the drawn air is dissolved in the wastewater in the vessel and used by the active bacterial mass. The apparatus maintains the dissolved oxygen near saturation level. The bacteria produced in the calorie reducing reactor pass out of the reactor continuously, through the orifice. This causes new bacteria to be continuously produced. The rate of bacteria production varies up and down the log growth curve as food calories vary. Thus, there is a continual demand for new growth that increases the rate of growth of each individual bacteria so that each individual bacterial becomes more massive or "fatter."

The high shear mixing caused by the high velocity recirculation keeps the bacteria dispersed into individual cells. This prevents flocculation that would lower BOD consumption. Because there is no flocculation, endogenous respiration with its associated oxygen demand is reduced. This lower resulting oxygen demand makes it easier to provide oxygen at near saturation levels, such levels being necessary for optimum bacteria growth.

The calorie reducer of the present invention is a discrete bacteria growth unit capable of an extremely high rate of bacteria growth. The incoming wastewater contains many bacteria to add to the bacteria within the calorie reducer. The bacteria within the calories reducer synthesize a new generation approximately every 20 minutes or slightly longer at lower temperatures. One fourth of the new generation bacteria is lost in the effluent. One object of the process is for the bacteria to completely consume the food with the minimum number of bacteria. In order to keep the number at a minimum, it is necessary to grow "fat" bacteria or "high mass" bacteria. The mass of each bacteria is maximum just before cell division. The maximum food consumption per bacteria is at the age of three hours. The process advantageously keeps the bacteria age at three or four hours. Accordingly, the calorie reducer must continually "waste" or discharge bacteria.

The aeration-mixing device of the calorie reducer provides high shear and high oxygen transfer rate to ensure that the bacteria are discrete particles. High shear and complete and rapid mixing allows for an optimal transfer of oxygen and maintains the oxygen dissolved near saturation level, an important condition for this process. No bacteria are in endogenous condition, i.e., there is no corresponding oxygen demand for this condition. The avoidance of the endogenous condition reduces the total oxygen demand for the process.

The process must continually remove bacteria. Accordingly, the organic concentration in the liquid surrounding the microorganisms is relatively low. Even so, the ratio of organics to bacteria is high because the number of bacteria is low. The bacterial numbers are also kept low because of the limited retention time. These methods also help reduce the oxygen requirement for the calorie reducer. The ratio of fat bacteria to thin bacteria is also high.

The result of this process is that the BOD load in mg/L in the influent is converted to bacterial mass whose mass in mg/L is very close to the incoming BOD. This process is efficient in this regard.

The discrete bacteria in the effluent of the calorie reducer form a stable emulsion. To meet effluent requirements, the emulsion can be eliminated without producing any waste product. This is accomplished by feeding the emulsion into a series of bio-reducers. The process contemplates growing attached protozoa within the bio-reducers that feed on the bacteria causing the emulsion. This eliminates the emulsion and produces a clean effluent.

Downstream of the calorie reducer, the bacteria leave the source of food and go into endogenous respiration where the bacterial mass is rapidly reduced. The bacteria are held in a bio-reducer vessel for 3 to 6 hours, preferably 4 hours. The contents of the bottom of the bio-reducer is pumped by a high shear pump through a high shear spray nozzle to distribute the flow over a fixed media where protozoa become attached. The protozoa consume the bacteria. The fixed media is held elevated above a reservoir. The contents of the bio-reducer reservoir are recirculated over the media many times. The shear spray nozzles break up the wastewater into small drops. The small drops passing through the air pick up oxygen from the air, which is dissolved in the large surface area of the drop. The drops become saturated with oxygen. The protozoa attached to the media extract approximately 50% of the bacteria from the wastewater as it passes over the protozoa while in the bio-reducer.

The protozoa grow on a surface of the media within the vessel, and a thin film of wastewater to be treated flows over a thin layer of bound water that contains the protozoa. The bound water layer must contain fewer organisms than the flowing wastewater thin film to have transfer. As the concentration of bacteria decreases, the rate of removal of bacteria decreases. Conversely, the most rapid transfer occurs when the incoming concentration is high and the bound water concentration is low. Normally this would occur at the top of the media surface.

High recirculation rate reduces the bacterial concentration in the flowing water film to maintain a uniform low concentration of protozoa over the entire surface. The small number of protozoa per unit area prevents build up and sloughing-off that would cause deterioration of effluent quality or cause plugging of the media. These conditions limit the reduction of bacteria in any bio-reducer cell because the flowing wastewater film contains close to the same number of organisms as the bound film.

Downstream of the bio-reducer is a further bio-reducer. The same process is repeated. Approximately 50% of the remaining bacteria are consumed by the protozoa. Downstream of the further bio-reducer is a still further bio-reducer wherein the same process is repeated. Approximately 50% of the remaining bacteria are consumed by the protozoa. Liquid passing out of the still further bio-reducer can be considered the treatment system effluent from a hypothetical wastewater treatment plant.

Further bio-reducer cells have less concentration of organisms in the flowing wastewater film to start with, and thus produce a bound film with fewer protozoa. Accordingly, it produces an effluent with less bacteria. By this means, effluent quality can be tailored by the number of cells. Each cell reduces concentration approximately 50%.

The combination of the calorie reducer with high shear recirculation and the multiple bio-reducers downstream of the calorie reducer reduces effluent organic and bacteria levels to below required levels and minimizes solid waste to be disposed.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

Figure 1:
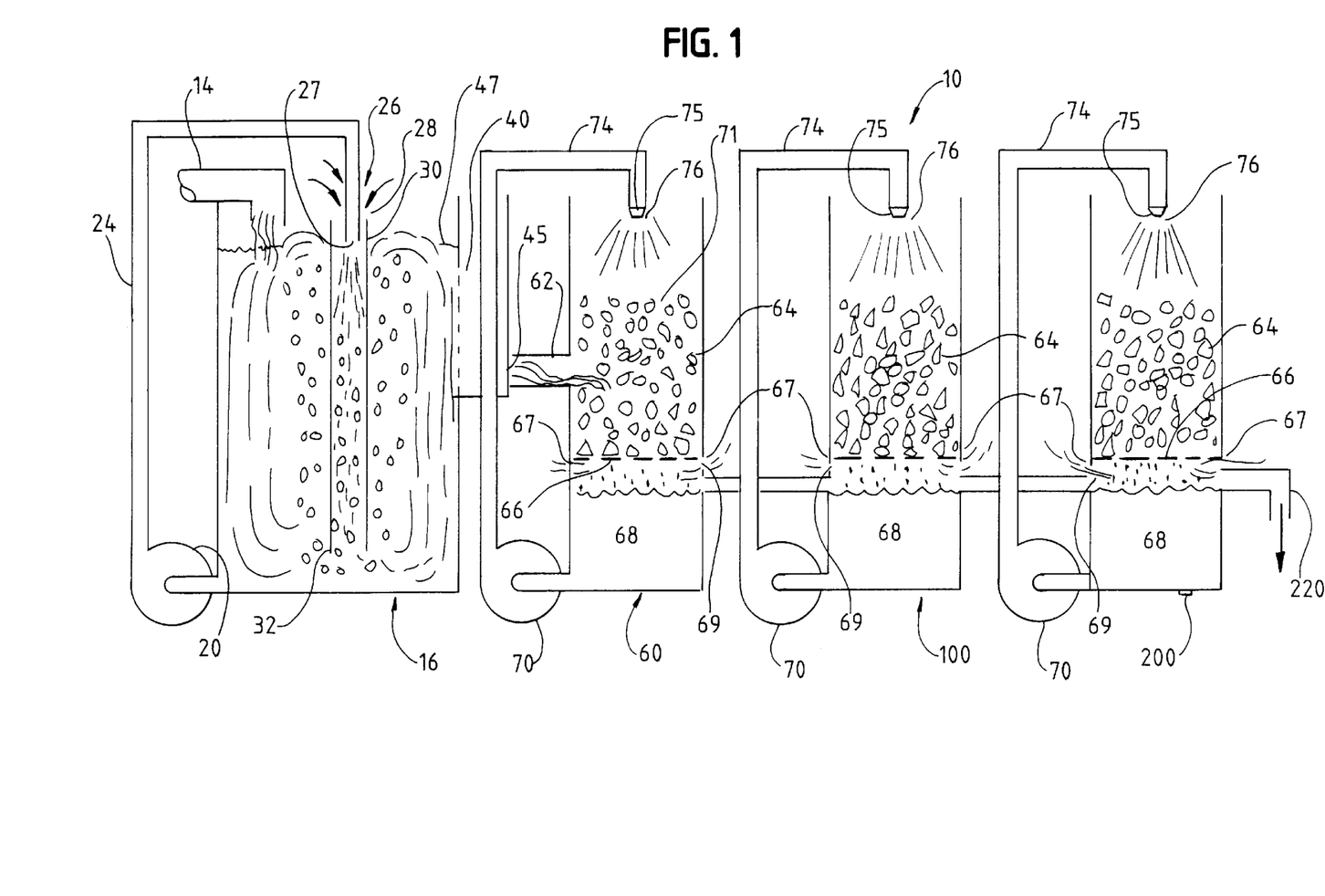
FIG. 1 is a schematic flow diagram of the system of the present invention.

FIG. 1 illustrates in schematic fashion the apparatus of the present invention. Biologically degradable waste in wastewater enters the treatment system 10 through an influent line 14 and into a calorie-reducing reactor vessel or calorie reducer 16. This vessel 16 is preferably sized to provide a liquid retention time of 2 to 4 hours, preferably 3 hours based on peak flow of the wastewater. For practical reasons, a retention time of 4 hours is a compromise which advantageously results in a system capacity which economically treats varying influent rates.

The influent BOD, inerts, solids and biodegradable solids are instantaneously mixed with a bacterial mass within the vessel 16. The normal design loading is approximately 250 mg/L BOD and 250 mg/L solids. Recirculation and mixing is done by a grinder pump 20 that disintegrates solids, homogenizes the wastewater, and pumps the wastewater at high velocity through a pipe 24. A jet from an open end 27 of the pipe 24 draws or pumps air 26 in large quantities through an annular opening 28. The wastewater and air impinge the wastewater otherwise standing within a tube 30 with sufficient velocity to drive the air and wastewater downward through a bottom open end 32 of the tube and to circulate the air within the vessel. The impingement shears the air into fine bubbles that are pumped throughout the vessel contents. The pumping action causes rapid high-shear mixing of the biodegradable food, bacteria and oxygen. Oxygen from the pumped air is dissolved into the wastewater in the vessel to be used by the active bacterial mass.

Aerated wastewater discharged from the bottom open end 32 of the tube 30 causes the contents of the vessel to circulate rapidly, vertically. The circulating wastewater cleans openings or slots of an effluent screen or separator 40. The screen 40 is preferably a fine vertical slot, wedge wire particle separator. The separator is preferably a 0.010 inch opening, stainless steel wedge-wire screen. The separator retains any solids not disintegrated within the vessel 16. Wastewater leaves the vessel 16 by passing through the separator 40 and then through an orifice 45 that is sized to regulate flow. A top surface 47 of the wastewater within the vessel 16 is free to move up and down with the varying rate of wastewater influent flow so that the vessel 16 becomes a "flow equalization tank" that keeps the wastewater retention time near 3 hours, regardless of the rate of influent flow.

Figure 2:
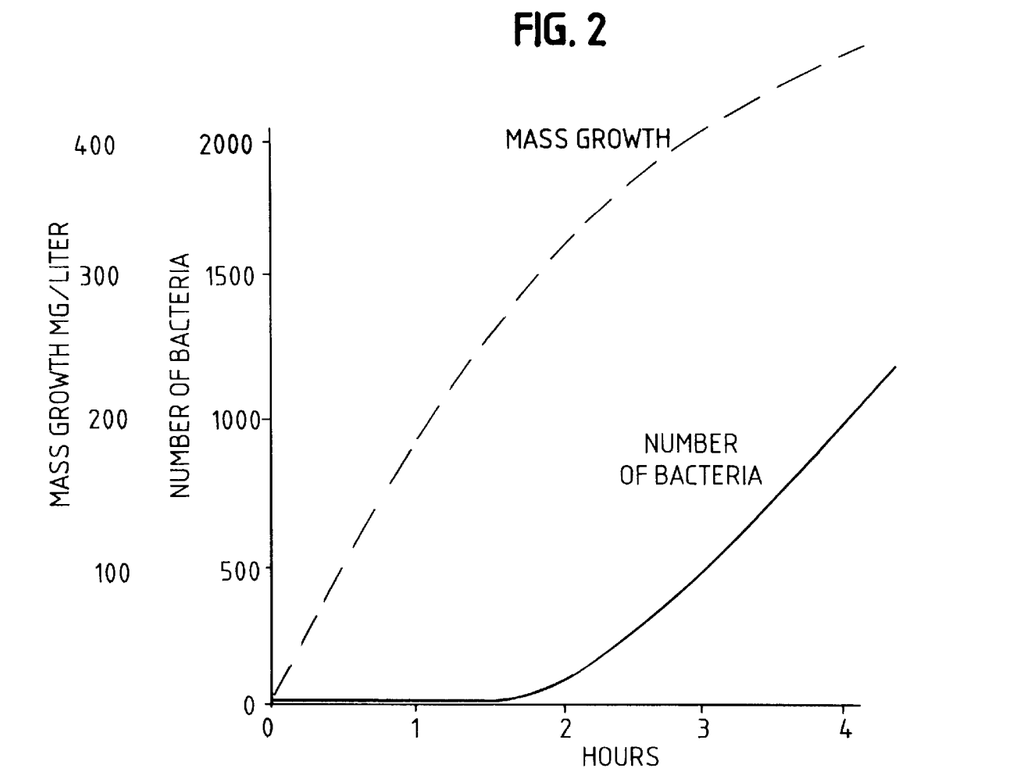
FIG. 2 is a graph showing the number of bacteria and the mass growth mg/L as a function of retention time within the calorie reducer of the apparatus of the present invention.

The system maintains the dissolved oxygen level near saturation, which is necessary in the process. The bacteria produced in the calorie-reducing reactor vessel 16 will continuously pass out of the reactor vessel due to the fact that the wastewater is continuously passing through the orifice 45. New bacteria are constantly being produced within the vessel 16. The rate of bacteria production varies up and down the log growth curve as the food calories vary. Typically, aerobic bacteria reproduce approximately every 20 minutes, depending upon the quantity of food available. Bacteria multiply by cellular division. In one hour there would be two generations of 8; in three hours there would be 512; in four hours there would be 4,096, and in six hours the population would be 262,000. The bacteria produced at any retention time continually pass out of the calorie reducer at that level of concentration. Thus, there is a continual demand for new growth that increases the rate of growth of each individual bacteria so that each individual bacteria becomes "fatter". This is the increasing growth phase or mass phase as shown in FIG. 2.

Figure 3:
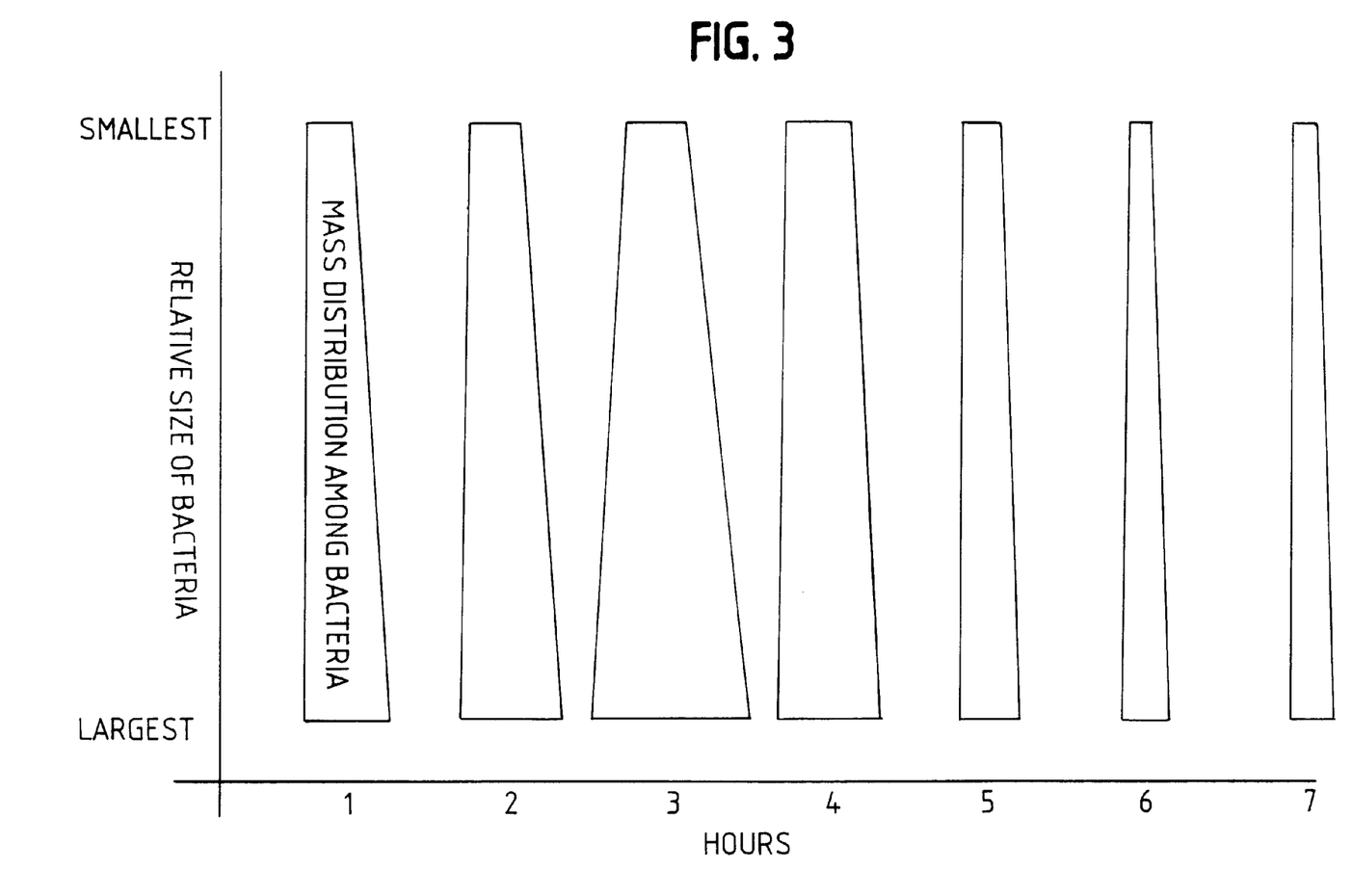
FIG. 3 is a graph of the mass distribution of bacteria in the calorie reducer as a function of retention time.
Figure 4:
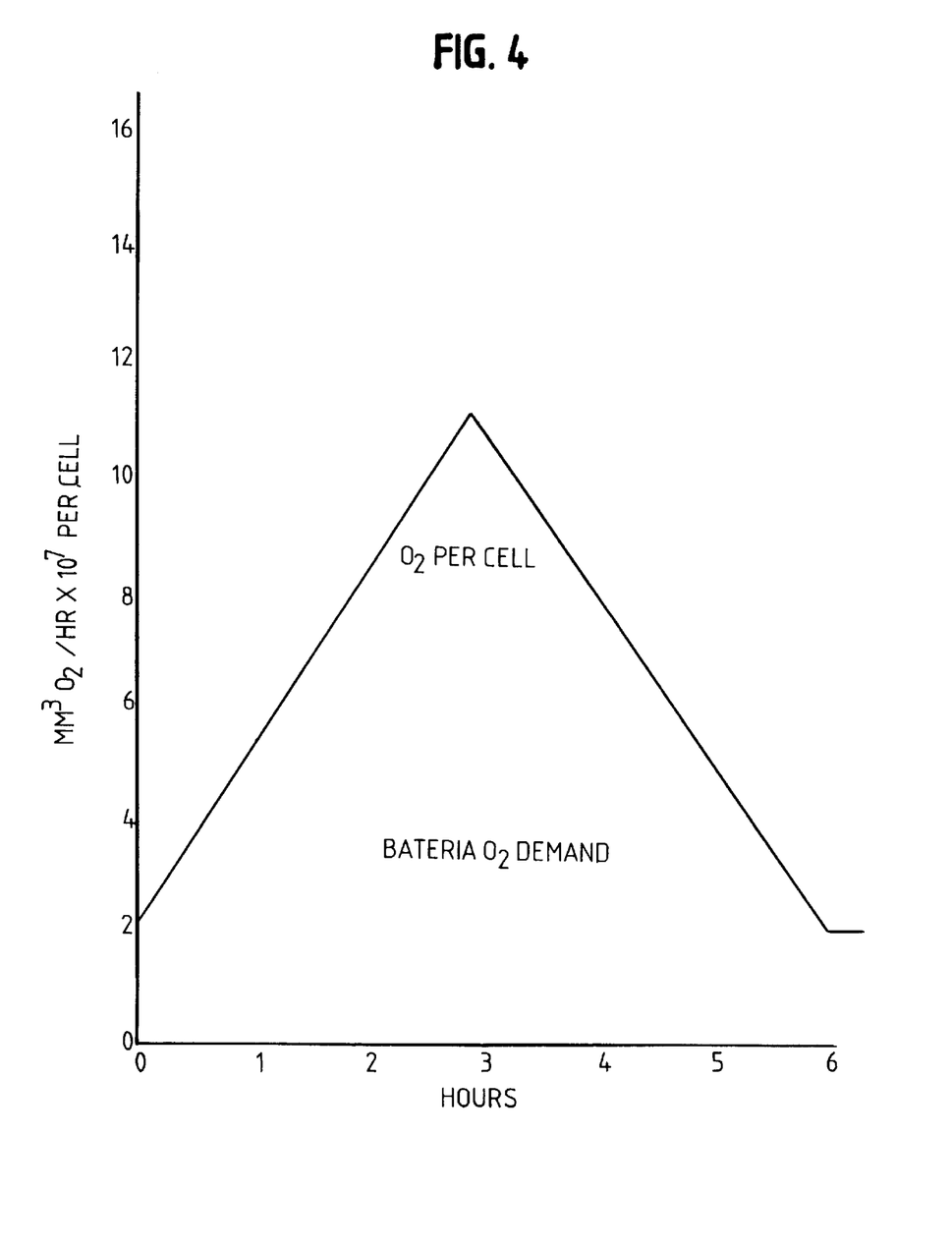
FIG. 4 is a graph of average food consumption per bacterial cell.
Figure 5:
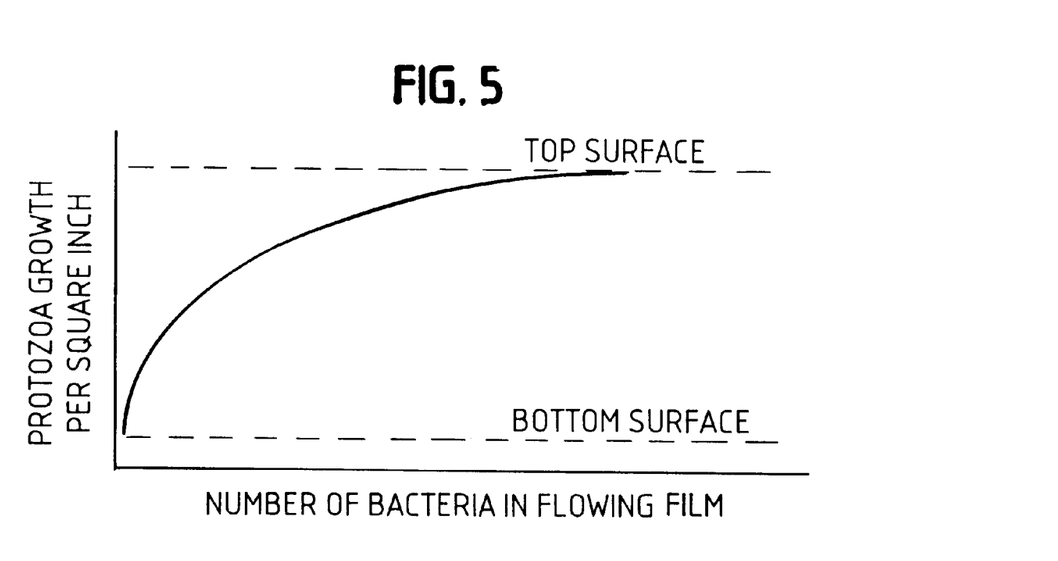
FIG. 5 is a graph of the protozoa growth per square inch versus the number of bacteria in flowing film of wastewater in a bioreducer.

The largest total mass distribution is obtained at about three hours as shown in FIG. 3. FIG. 4 illustrates that the greatest average of food consumption per bacterial cell is during the third hour of growth where oxygen consumption per cell is at a maximum and oxygen consumption is proportional to bacterial BOD utilization.

The high shear mixing caused by the high velocity wastewater and air mixing at the opening 28, keeps the bacteria dispersed into individual cells. Preferably the wastewater has a velocity above 10 feet per second and preferably 15 to 25 feet per second. This prevents flocculation that would lower BOD consumption. Endogenous respiration with its corresponding oxygen demand is avoided by the absence of flocculation. The lower resulting oxygen demand makes it easier to provide near oxygen saturation levels that are necessary for optimum growth. The calorie reducer of the present invention creates a high oxygen transfer rate of approximately 3.5 lbs $O_2$/(hr)(h.p.), where "lbs" is pounds, "hr" is hours, and "h.p." is horsepower of the aeration device, in this case the motor driving the grinder pump 20.

Immediately after passing out of the calorie reducing reactor 16, the bacteria leave the source of food and go into endogenous respiration where their mass is rapidly reduced. The bacteria-laden wastewater enters a first bio-reducer 60 through an inlet 62 and is percolated through a fixed media 64. The fixed media 64 is supported on a grid or screen 66 above a reservoir 68. Openings 69 allow air 67 to enter the bioreducer 60 between the media 64 and a top surface 71 of the wastewater within the reservoir 68.

Figure 6:
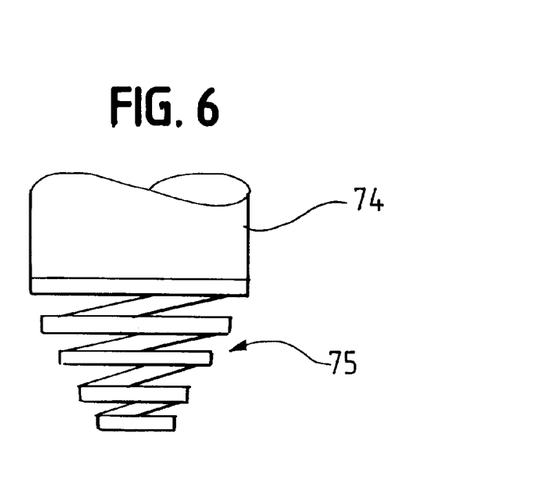
FIG. 6 is a schematic enlarged view of a spray nozzle.

Bio-reducer 60 has the reservoir 68 for holding the wastewater for a prescribed time. The retention time in the bio-reducer 60 is 3 to 6 hours, preferably 4 hours. The wastewater from the reservoir 68 is pumped by a high shear pump 70 through a recirculation pipe 74 and out of high shear spray nozzle 75 to distribute the recirculating flow in a flat spray 76 onto a fixed media 64. Protozoa within the wastewater become attached to the fixed media 64. The protozoa consume the bacteria. The wastewater from the reservoir contents circulate over the fixed media 64 every six minutes. In the four hours the liquid is in the bio-reducer 60, the wastewater from the reservoir 68 passes over the media 40 times. The wastewater recycle rate from the pump 70 is effectively between about 3 to 15 reservoir liquid volumes per hour; preferably 10 reservoir volumes per hour. The lower limit of 3 reservoir liquid volumes per hour is due to the fact that the bacteria duplicate every 20 minutes. This circulation rate ensures that the bacterial population decreases in the bio-reducer. The upper limit is a practical recommendation considering the required horsepower of the pump. The repetitive shear keeps the bacteria dispersed so the protozoa attached to the media have easy access to the bacteria. The high shear spray nozzle 75 is shown in FIG. 6. It is configured as a coil element with an overall tapered profile. The nozzle 75 can be a "fog nozzle" such as a BETE fog nozzle, which breaks up the wastewater into small drops which are sprayed in the flat spray 76 substantially evenly over the media.

The small drops passing through the air pick up oxygen from the air, which is dissolved in the large surface area of each drop. The drops become saturated with oxygen. Furthermore, the continually renewed surface of the liquid film of the drop passing over the large surface of the media picks up dissolved oxygen. This oxygen pick-up keeps the liquid saturated with oxygen. The protozoa attached to the media extract approximately 50% of the bacteria from the liquid as it passes over the protozoa while in the bio-reducer 60.

The liquid passing through bio-reducer 60 enters a second bio-reducer 100 of substantially identical configuration and having an associated recirculation pump 70, a recirculation pipe 74 and a nozzle 75 of substantially identical configuration as provided with bio-reducer 60. The same process as occurs in the bio-reducer 60 is repeated in the bio-reducer 100. Approximately 50% of the remaining bacteria are consumed by the protozoa in the second bio-reducer 100.

The media is preferably in the form of 2" diameter plastic wire-mesh tubes. The mesh has ½" openings. The tubes are oriented vertically and are 2' tall. The tubes are packed together and fixed in 2'×2' packed square bundles. Two stacked layers of bundles are provided for a total media depth of four feet. The media volume to vessel volume is approximately 40% to 50%. The "vessel volume" is taken as the volume from the bottom of the reservoir to the top of the media. The media is preferably composed of polypropylene or other compatible plastic.

The liquid passing out of the second bio-reducer 100 flows into a third bio-reducer 200 of substantially identical configuration and having an associated recirculation pump 70, a recirculation pipe 74 and a nozzle 75 of substantially identical configuration as bio-reducer 100. The same process as occurs in bio-reducer 100 is repeated in bio-reducer 200. Approximately 50% of the remaining bacteria are consumed by the protozoa in the third bio-reducer 200.

The liquid passing out of the third bio-reducer 200 is the effluent from the particular treatment plant described in FIG. 1.

In summary, a typical domestic wastewater stream entering the process apparatus would contain 250 mg/L BOD and 250 mg/L solids. This BOD or calorie content of the entering fluid would be reduced to 60 to 80 mg/L BOD with a resultant bacterial population of 120 to 160 mg/L in the calorie reducer 16. In the bio-reducer 60 the protozoa consume approximately 50% of the bacteria, reducing the bacterial population to about 60 to 80 mg/L. The "fat" bacteria with a lack of food go into endogenous respiration where they consume themselves. In this starving condition the mass is reduced another 50%. Bacterial mass at that point is 30 to 40 mg/L.

Bio-reducers 100 and 200 each reduce bacterial numbers, but the mass reduction is not as significant. This results in a bacterial mass of 15 to 20 mg/L in second bio-reducer 100, and 7 to 10 mg/L in third bio-reducer 200. BOD would be reduced 50% in each bio-reducer with a total reduction down to 7 to 10 mg/L in system effluent 220. Additional bio-reducer sections can be added to reduce effluent BOD and solids if desired. The system can thus be tailored to meet specific effluent requirements.

Table 1A and 1B illustrates the experimental results achieved in a pilot plant in accordance with FIG. 1.

"#1" denotes the calorie reducer 16.

"#2" denotes the first bio-reducer 60.

"#3" denotes the second bio-reducer 100.

"#4" denotes the third bio-reducer 200.

"TSS" is an abbreviation for total suspended solids in milligrams per liter.

"INF" is an abbreviation for influent.

"EFF" is an abbreviation for effluent.

"K" denotes a "composite sample", i.e., a sample corresponding to a cumulative sample collected throughout a day.

"S" denotes "grab sample," i.e., a sample taken and measured and disposed, and not accumulated with previous samples.

"BOD" is an abbreviation for biochemical oxygen demand in milligrams per liter.

"DO" is an abbreviation for dissolved oxygen in milligrams per liter.

"UPTAKE" is an abbreviation for "oxygen uptake" or oxygen consumed by bacteria in milligrams per liter per 10 minutes.

TABLES 1A and 1B demonstrate that for a typical wastewater plant the effluent BOD amount and effluent TSS amount are very low, which indicates a low bacteria discharge and a low amount of solids discharge, respectively.

The TABLES 1A and 1B represent a prototype test conducted during a test month. On Day 1, the system was configured with the calorie reducer and the first bio-reducer having self contained recirculation as shown in FIG. 1, but the second bio-reducer 100 had its reservoir recirculating to an overhead spray nozzle of the third bio-reducer 200 and the third bio-reducer 200 had its reservoir contents recirculating to an overhead spray nozzle of the second bio-reducer 100. On Day 2, the system was re-configured in accordance with FIG. 1, and remained in that configuration for the rest of the test month.

The calorie reducer was operated with a pumped recirculation rate of 120 g.p.m. providing a wastewater velocity at the open end 27 of the pipe 24 of 19 ft per second. The pipe 24 was a ½" diameter pipe and the tube 30 was a 4" diameter tube. The tube open end 32 was about 3" above a bottom of the calorie reducer. The pipe open end extended downward to a position about 6" below an operating level of the calorie reducer (liquid level outside the tube 30). The operating level was at about 7'9" above the calorie reducer bottom.

The bioreducers 60, 100, 200 were each operated with a pumped recirculation rate of 10 "reservoir volumes" (amount of wastewater held in the reservoir) per hour. The nozzle 75 for each bioreducer was elevated about 2 feet above a surface of the media held in a 6 foot by 6 foot square (horizontal profile) bio-reducer.

The prototype plant treated a 2 g.p.m. influent rate of wastewater (3000 gallons per day).

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

TABLE 1A

| Day | #1 DO | #1 Uptake | #2 DO | #2 Uptake | #3 DO | #3 Uptake | #4 DO | #4 Uptake | Influent $TSS_K$ | Influent $TSS_S$ | Influent $BOD_K$ | Influent $BOD_S$ | Effluent $TSS_S$ | Effluent $BOD_S$ |
|---|---|---|---|---|---|---|---|---|---|---|---|---|---|---|
| 1 | 7.5 | 1.2 | 8.4 | 0.3 | 9.5 | 0.1 | 9.5 | 0.1 | 78 | 62 | 150 | 181 | 7 | 5 |
| 2 |  | 0.9 | 8.0 | 0.1 | 9.0 | 0.2 | 8.8 | 0.0 | 96 | 52 | 134 |  | 9 |  |
| 3 | 6.5 | 1.6 | 7.3 | 0.1 | 8.4 | 0.1 | 8.5 | 0.2 | 114 | 72 |  |  | 4 |  |
| 4 |  |  |  |  |  |  |  |  | 82 |  |  |  |  |  |
| 5 |  |  |  |  |  |  |  |  | 81 |  |  |  |  |  |
| 6 | 7.0 | 1.8 | 7.4 | 0.3 | 8.5 | 0.1 | 8.7 | 0.0 | 80 | 112 |  |  | 5 |  |
| 7 | 6.5 | 0.8 | 7.6 | 0.1 | 8.6 | 0.1 | 8.8 | 0.1 | 127 | 72 | 198 |  | 5 |  |
| 8 | 6.5 | 1.1 | 7.1 | 0.2 | 8.1 | 0.1 | 8.3 | 0.1 | 116 | 72 | 132 |  | 0 |  |
| 9 | 7.5 | 0.5 | 8.5 | 0.1 | 9.8 | 0.0 | 10.0 | 0.0 | 96 | 56 | 107 |  | 8 |  |
| 10 | 7.9 | 1.1 | 8.7 | 0.1 | 10.1 | 0.1 | 10.3 | 0.0 | 80 | 72 |  | 178 | 4 | 4 |
| 11 |  |  |  |  |  |  |  |  | 85 |  |  |  |  |  |
| 12 |  |  |  |  |  |  |  |  | 98 |  |  |  |  |  |
| 13 | 9.8 | 0.5 | 10.0 | 0.2 | 10.0 | 0.2 | 10.0 | 0.1 | 62 | 164 |  |  | 0 |  |
| 14 | 8.1 | 0.7 | 8.4 | 0.1 | 10.3 | 0.0 | 10.5 | 0.1 | 108 | 144 | 99 |  | 0 |  |
| 15 | 8.8 | 0.9 | 9.5 | 0.1 | 10.0 | 0.0 | 10.0 | 0.2 | 124 | 56 | 108 | 106 | 1 | 1 |
| 16 | 7.9 | 0.8 | 8.3 | 0.1 | 9.3 | 0.1 | 9.7 | 0.1 | 72 | 80 | 128 |  | 8 |  |
| 17 | 8.7 | 0.6 | 9.8 | 0.2 | 10.9 | 0.2 | 11.1 | 0.0 | 80 | 64 |  | 139 | 5 | 5 |
| 18 |  |  |  |  |  |  |  |  | 84 |  |  |  |  |  |
| 19 |  |  |  |  |  |  |  |  | 90 |  |  |  |  |  |
| 20 | 8.6 | 0.7 | 9.9 | 0.0 | 11.6 | 0.1 | 12.0 | 0.1 | 88 | 44 |  |  | 12 |  |
| 21 | 8.1 | 1.0 | 9.0 | 0.0 | 10.9 | 0.0 | 11.1 | 0.0 | 94 | 232 | 134 |  | 15 |  |
| 22 | 8.6 | 0.6 | 10.6 | 0.1 | 11.8 | 0.1 | 12.4 | 0.0 | 112 | 61 | 127 | 30 |  | 6 |
| 23 | 8.0 | 1.3 | 9.4 | 0.0 | 10.7 | 0.0 | 11.2 | 0.1 | 86 |  |  |  |  |  |
| 24 | 6.9 | 0.6 | 7.0 | 0.0 | 8.8 | 0.0 | 9.1 | 0.0 | 92 |  |  | 46 |  | 4 |
| 25 |  |  |  |  |  |  |  |  | 94 |  |  |  |  |  |
| 26 |  |  |  |  |  |  |  |  | 76 |  |  |  |  |  |
| 27 | 11.3 | 0.9 | 11.6 | 0.0 | 13.1 | 0.0 | 14.0 | 0.0 | 82 | 91 |  |  | 6 |  |
| 28 | 9.3 | 0.5 | 10.3 | 0.2 | 11.3 | 0.1 | 11.5 | 0.0 | 48 | 50 | 106 |  | 3 |  |

TABLE 1A-continued

| Day | #1 DO | Uptake | #2 DO | Uptake | #3 DO | Uptake | #4 DO | Uptake | Influent $TSS_K$ | $TSS_S$ | Influent $BOD_K$ | $BOD_S$ | Effluent $TSS_S$ | Effluent $BOD_S$ |
|---|---|---|---|---|---|---|---|---|---|---|---|---|---|---|
| 29 | 8.6 | 0.7 | 8.1 | 0.0 | 10.0 | 0.2 | 10.1 | 0.1 | 100 | 50 |  | 170 | 5 | 5 |
| 30 | 8.0 | 1.5 | 7.9 | 0.0 | 9.3 | 0.0 | 9.6 | 0.0 | 96 | 47 | 116 |  | 3 |  |
| 31 | 7.8 | 1.6 | 8.1 | 0.0 | 9.4 | 0.0 | 9.8 | 0.0 | 82 | 43 |  | 139 | 7 | 10 |

TABLE 1B

| Day | INF TSS | #1 TSS | #2 TSS | #3 TSS | #4 TSS | Atmosphere °C. | #1 °C. | #4 °C. |
|---|---|---|---|---|---|---|---|---|
| 1 | 62 |  |  |  | 7 |  |  |  |
| 2 | 52 | 32 | 12 | 9 | 9 |  |  |  |
| 3 | 72 | 72 | 80 | 9 | 4 |  |  |  |
| 4 |  |  |  |  |  |  |  |  |
| 5 |  |  |  |  |  |  |  |  |
| 6 | 112 | 80 | 26 | 14 | 5 |  |  |  |
| 7 | 72 | 128 | 34 | 20 | 5 |  |  |  |
| 8 | 72 | 52 | 5 | 0 | 0 |  |  |  |
| 9 | 56 | 56 | 19 | 12 | 8 |  |  |  |
| 10 | 72 | 100 | 24 | 12 | 4 |  |  |  |
| 11 |  |  |  |  |  |  |  |  |
| 12 |  |  |  |  |  |  |  |  |
| 13 | 164 | 124 | 40 | 7 | 0 |  | 18 | 8 |
| 14 | 144 | 64 | 10 | 6 | 0 |  | 19 | 12 |
| 15 | 56 | 76 | 21 | 12 | 1 |  | 21 | 14 |
| 16 | 80 | 72 | 15 | 8 | 8 | 14 | 22 | 15 |
| 17 | 64 | 64 | 22 | 13 | 5 | 12 | 21 | 10 |
| 18 |  |  |  |  |  |  |  |  |
| 19 |  |  |  |  |  |  |  |  |
| 20 | 44 | 156 | 42 | 16 | 12 | 7 | 21 | 8 |
| 21 | 232 | 64 | 28 | 15 | 15 | 11 | 20 | 11 |
| 22 | 61 | 72 | 27 | 10 | 12 | 5 | 20 | 6 |
| 23 | 57 | 76 | 27 | 14 | 9 | 9 | 20 | 11 |
| 24 | 58 | 75 | 26 | 14 | 2 | 15 | 23 | 16 |
| 25 |  |  |  |  |  |  |  |  |
| 26 |  |  |  |  |  |  |  |  |
| 27 | 91 | 68 | 27 | 14 | 6 | -4 | 16 | 8 |
| 28 | 50 | 48 | 23 | 9 | 3 | 2 | 18 | 10 |
| 29 | 50 | 56 | 19 | 9 | 5 | 2 | 20 | 16 |
| 30 | 47 | 68 | 16 | 13 | 3 | 17 | 21 | 17 |
| 31 | 43 | 62 | 28 | 12 | 7 |  |  |  |

The invention claimed is:

1. A method of treating wastewater, comprising the steps of:

delivering wastewater into a first vessel;

recycling wastewater held in said first vessel and delivering the recycled wastewater in a high velocity stream back into the first vessel, said high velocity stream sufficient to prevent flocculation within said first vessel;

adding air to said high velocity stream of recycled wastewater delivered into said first vessel;

holding wastewater in said first vessel for a preselected retention time substantially corresponding to an age of maximum waste consumption per bacteria.

2. The method of claim 1 wherein said step of holding the wastewater is further defined in that the preselected retention time is between 2 hours and 4 hours.

3. The method of claim 2 wherein said step of holding the wastewater is further defined in that the preselected retention time is approximately 3 hours.

4. The method of claim 1 wherein said step of delivering recycled wastewater is further defined in that the recycled wastewater is delivered into the first vessel at a velocity of at least 10 feet per second.

5. The method of claim 4 wherein the step of delivering recycled wastewater is further defined in that the velocity is between 15 and 25 feet per second.

6. The method of claim 1 comprising the further steps of:

delivering wastewater from said first vessel into a second vessel, said wastewater substantially free of BOD derived from waste and containing bacteria;

providing media having attached protozoa inside said second vessel;

recycling wastewater from a bottom reservoir of said second vessel to a top of said second vessel and onto said media, such that said protozoa can consume bacteria.

7. The method of claim 6 wherein said step of providing media is further defined in that said media is held above a surface of the wastewater held within said reservoir.

8. The method of claim 7 comprising the further steps of:

delivering wastewater from said second vessel into a third vessel;

providing media inside said third vessel;

recycling wastewater from a bottom reservoir of said third vessel to a top of said third vessel and onto the media held therein.

9. The method of claim 8 wherein said step of providing media in said third vessel is further defined in that said media is held above a surface of the wastewater held within said bottom reservoir of said third vessel.

10. The method of claim 6 wherein said wastewater is retained in said second vessel between about 2 and 6 hours.

11. The method of claim 10 wherein said wastewater is retained in said second vessel for about 4 hours.

12. A method of treating wastewater comprising the steps of:

delivering wastewater into a first vessel having a first reservoir, said wastewater substantially free of BOD derived from waste and containing bacteria;

providing media inside said first vessel, said media having attached protozoa, said media held above a surface of the wastewater contained within said first reservoir; and recycling wastewater from said first reservoir of said first vessel to an upper region of said first vessel and onto said media held therein in order for said protozoa to consume bacteria.

13. The method of claim 12 comprising the further steps of:

delivering wastewater from said first vessel into a second vessel, the second vessel having a second reservoir;

providing media inside said second vessel, said media held above a surface of the wastewater held within said second reservoir; and recycling wastewater from said second reservoir of said second vessel to an upper region of said second vessel and onto the media held therein.

14. The method of claim 12 wherein said wastewater is retained in said first vessel between about 2 and 6 hours.

15. The method of claim 14 wherein said wastewater is retained in said first vessel for about 4 hours.

16. The method of claim 13 wherein said wastewater is retained in said first and second vessels between 2 and 6 hours.

17. The method of claim 12 wherein said wastewater is recycled at a rate of at least 10 reservoir volumes per hour.

18. The method of claim 1, wherein said step of holding the wastewater is further defined in that the preselected retention time is selected such that the bacterial mass is between 300 and 450 mg/liter.

19. The method of claim 1, wherein said step of holding the wastewater is further defined in that the preselected retention time is selected such that the bacterial mass is between approximately 350 and 400 mg/liter.

* * * * *